(12) United States Patent
Colmenarez et al.

(10) Patent No.: US 7,219,062 B2
(45) Date of Patent: May 15, 2007

(54) SPEECH ACTIVITY DETECTION USING ACOUSTIC AND FACIAL CHARACTERISTICS IN AN AUTOMATIC SPEECH RECOGNITION SYSTEM

(75) Inventors: Antonio Colmenarez, Maracaibo (VE); Andreas Kellner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 443 days.

(21) Appl. No.: 10/058,730

(22) Filed: Jan. 30, 2002

(65) Prior Publication Data

US 2003/0144844 A1   Jul. 31, 2003

(51) Int. Cl.
*G10L 11/00* (2006.01)
*G10L 15/20* (2006.01)
*G06K 9/00* (2006.01)

(52) U.S. Cl. .................. 704/270; 704/233; 382/100
(58) Field of Classification Search ............... 704/270, 704/246, 233; 382/115, 181
See application file for complete search history.

(56) References Cited

U.S. PATENT DOCUMENTS

| | | | |
|---|---|---|---|
| 4,449,189 A * | 5/1984 | Feix et al. ............... | 704/272 |
| 4,975,960 A | 12/1990 | Petajan | |
| 5,412,378 A * | 5/1995 | Clemens .................. | 340/5.6 |
| 5,428,598 A | 6/1995 | Veldhuis et al. | |
| 5,473,726 A | 12/1995 | Marshall | |
| 5,621,858 A | 4/1997 | Stork et al. | |
| 5,884,257 A | 3/1999 | Maekawa et al. | |
| 5,915,027 A | 6/1999 | Cox et al. | |
| 6,216,103 B1 | 4/2001 | Wu et al. ................. | 704/253 |
| 6,219,639 B1 * | 4/2001 | Bakis et al. ............. | 704/246 |
| 6,219,640 B1 * | 4/2001 | Basu et al. ............... | 704/246 |
| 6,594,629 B1 * | 7/2003 | Basu et al. ............... | 704/251 |
| 6,721,706 B1 * | 4/2004 | Strubbe et al. ........... | 704/275 |
| 6,754,373 B1 * | 6/2004 | de Cuetos et al. ........ | 382/118 |
| 6,853,972 B2 * | 2/2005 | Friedrich et al. ......... | 704/275 |

FOREIGN PATENT DOCUMENTS

WO    WO 99/17288    4/1999

OTHER PUBLICATIONS

De Cuetos et al., "Audio-visual intent-to-speak detection for human-computer interaction", ICASSP '00, Proceedings, Jun. 5-9, 2000, vol. 6, pp. 2373-2376.*

Patent Abstracts of Japan, Terashita Hiromi: "Utterance Start Monitor, Speaker Identification Device, Voice Input System, Speaker Identification System And Communication System" Publication No. 2000338987, Aug. 12, 2000, Application No. 11150614, May 28, 1999.

Garg et al: "Audio-visual speaker detection using dynamic Bayesian networks" Proceedings Fourth IEEE International Conference On Automatic Face And Gesture Recognition (Cat. No. PR00580), Proceedings Of The Fourth International Conference On Automatic Face And Gesture recognition, Mar. 28-30, 2000, pp. 384-390.

* cited by examiner

*Primary Examiner*—David Hudspeth
*Assistant Examiner*—Brian Albertalli
(74) *Attorney, Agent, or Firm*—Daniel J. Piotrowski

(57) ABSTRACT

An automatic speech recognizer only responsive to acoustic speech utterances is activated only in response to acoustic energy having a spectrum associated with the speech utterances and at least one facial characteristic associated with the speech utterances. In one embodiment, a speaker must be looking directly into a video camera and the voices and facial characteristics of plural speakers must be matched to enable activation of the automatic speech recognizer.

25 Claims, 2 Drawing Sheets

SPEECH ACTIVITY DETECTION USING ACOUSTIC AND FACIAL CHARACTERISTICS IN AN AUTOMATIC SPEECH RECOGNITION SYSTEM

FIELD OF INVENTION

The present invention relates generally to automatic speech recognition systems and methods and more particularly to an automatic speech recognition system and method wherein an automatic speech recognizer only responsive to acoustic speech utterances is activated only in response to acoustic energy having a spectrum associated with the speech utterances and at least one facial characteristic associated with the speech utterances.

BACKGROUND OF THE INVENTION

Currently available speech recognition systems determine the beginning and end of utterances by responding to the presence and absence of only acoustic energy having a spectrum associated with the utterances. If a microphone associated with the speech recognition system is in an acoustically noisy environment including, for example, speakers other than the speaker whose voice is to be recognized or activated machinery, including telephones (particularly ringing telephones), the noise limits the system performance. Such speech recognition systems attempt to correlate the acoustic noise with words it has learned for a particular speaker, resulting in the speech recognition system producing an output that is unrelated to any utterance of the speaker whose voice is to be recognized. In addition, the speech recognition system may respond to the acoustic noise in a manner having an adverse effect on its speech learning capabilities.

We are aware that the prior art has considered the problems associated with an acoustically noisy environment by detecting acoustic energy and facial characteristics of a speaker whose voice is to be recognized. For example, Maekawa et al, U.S. Pat. No. 5,884,257, and Stork et al, U.S. Pat. No. 5,621,858, disclose voice recognition systems that respond to acoustic energy of a speaker, as well as facial characteristics associated with utterances by the speaker. In Maekawa et al., lip movement is detected by a visual system including a light source and light detector. The system includes a speech period detector which derives a speech period signal by detecting the strength and duration of the movement of the speaker's lips. The system also includes a voice recognition system and an overall judgment section which determines the content of an utterance based on the acoustic energy in the utterance and movement of the lips of the speaker. In Stork et al., lip, nose and chin movement are detected by a video camera. Output signals of a spectrum analyzer responsive to acoustic energy and a position vector generator responsive to the video camera supply signals to a speech classifier trained to recognize a limited set of speech utterances based on the output signals of the spectrum analyzer and position vector generator.

In both Maekawa et al. and Stork et al., complete speech recognition is performed in parallel to image recognition. Consequently, the speech recognition processes of these prior art devices would appear to be somewhat slow and complex, as well as require a significant amount of power, such that the devices do not appear to be particularly well-suited as remote control devices for controlling equipment.

SUMMARY OF THE INVENTION

In accordance with one aspect of the present invention, a speech recognition system comprises (1) an acoustic detector for detecting speech utterances of a speaker, (2) a visual detector for detecting at least one facial characteristic associated with speech utterances of the speaker, and (3) a processing arrangement connected to be responsive to the acoustic and visual detectors for deriving a signal. The signal has first and second values respectively indicative of the speaker making and not making speech utterances such that the first value is derived only in response to the acoustic detector detecting a finite, nonzero acoustic response while the visual detector detects at least one facial characteristic associated with speech utterances of the speaker. A speech recognizer for deriving an output indicative of the speech utterances as detected only by the acoustic detector is connected to be responsive to the acoustic detector only while the signal has the first value.

Another aspect of the invention relates to a method of recognizing speech utterances of a speaker with an automatic speech recognizer only responsive to acoustic speech utterances of the speaker. The method comprises: (1) detecting acoustic energy having a spectrum associated with speech utterances, (2) detecting at least one facial characteristic associated with speech utterances of the speaker, and (3) activating the automatic speech recognizer only in response to the detected acoustic energy having a spectrum associated with speech utterances while the at least one facial characteristic associated with speech utterances of the speaker is occurring.

Preferably, activation of the automatic speech recognizer is prevented in response to any of: (1) no acoustic energy having a spectrum associated with speech utterances being detected while no facial characteristic associated with speech utterances of the speaker is detected, (2) acoustic energy having a spectrum associated with speech utterances being detected while no facial characteristic associated with speech utterances of the speaker is detected, and (3) no acoustic energy having a spectrum associated with speech utterances being detected while at least one facial characteristic associated with speech utterances of the speaker is detected.

In the preferred embodiment, the beginning of each speech utterance is assuredly coupled to the speech recognizer. The beginning of each speech utterance is assuredly coupled to the speech recognizer by: (a) delaying the speech utterance, (b) recognizing the beginning of each speech utterance, and (c) responding to the recognized beginning of each speech utterance to couple the delayed speech utterance associated with the beginning of each speech utterance to the speech recognizer and thereafter sequentially coupling the remaining delayed speech utterances to the speech recognizer. It is assured that no detected acoustic energy is coupled to the speech recognizer upon the completion of a speech utterance. Assurance that no detected acoustic energy is coupled to the speech recognizer upon the completion of a speech utterance is provided by: (a) delaying the acoustic energy associated with the speech utterance, (b) recognizing the completion of each speech utterance, and (c) responding to the recognized completion of each speech utterance to decouple delayed acoustic energy occurring after the completion of each speech utterance from the speech recognizer.

In the preferred apparatus embodiment, the delay is provided by a ring buffer that is effectively indexed so that segmented detected acoustic energy at the beginning of the utterance and segmented detected acoustic energy at the end of the utterance and segmented detected acoustic energy between the beginning and end of the utterance are coupled to the speech recognizer to the exclusion of acoustic energy prior to the beginning of the utterance and acoustic energy subsequent to the end of the utterance.

The processing arrangement in first and second embodiments respectively includes a lip motion and a face recognizer. The face recognizer is preferably arranged for enabling the signal to have the first value only in response to the face of the speaker being at a predetermined orientation relative to the visual detector. The face recognizer also preferably: (1) detects and distinguishes the faces of a plurality of speakers, and (2) enables the signal to have the first value only in response to the speaker having a recognized face.

In the second embodiment, the processing arrangement also includes a speaker identity recognizer for: (1) detecting and distinguishing speech patterns of a plurality of speakers, and (2) enabling the signal to have the first value only in response to the speaker having a recognized speech pattern.

The above and still further objects, features and advantages of the present invention will become apparent upon consideration of the following detailed description of a specific embodiment thereof, especially when taken in conjunction with the accompanying drawing.

DETAILED DESCRIPTION OF THE DRAWING

Figure 1:
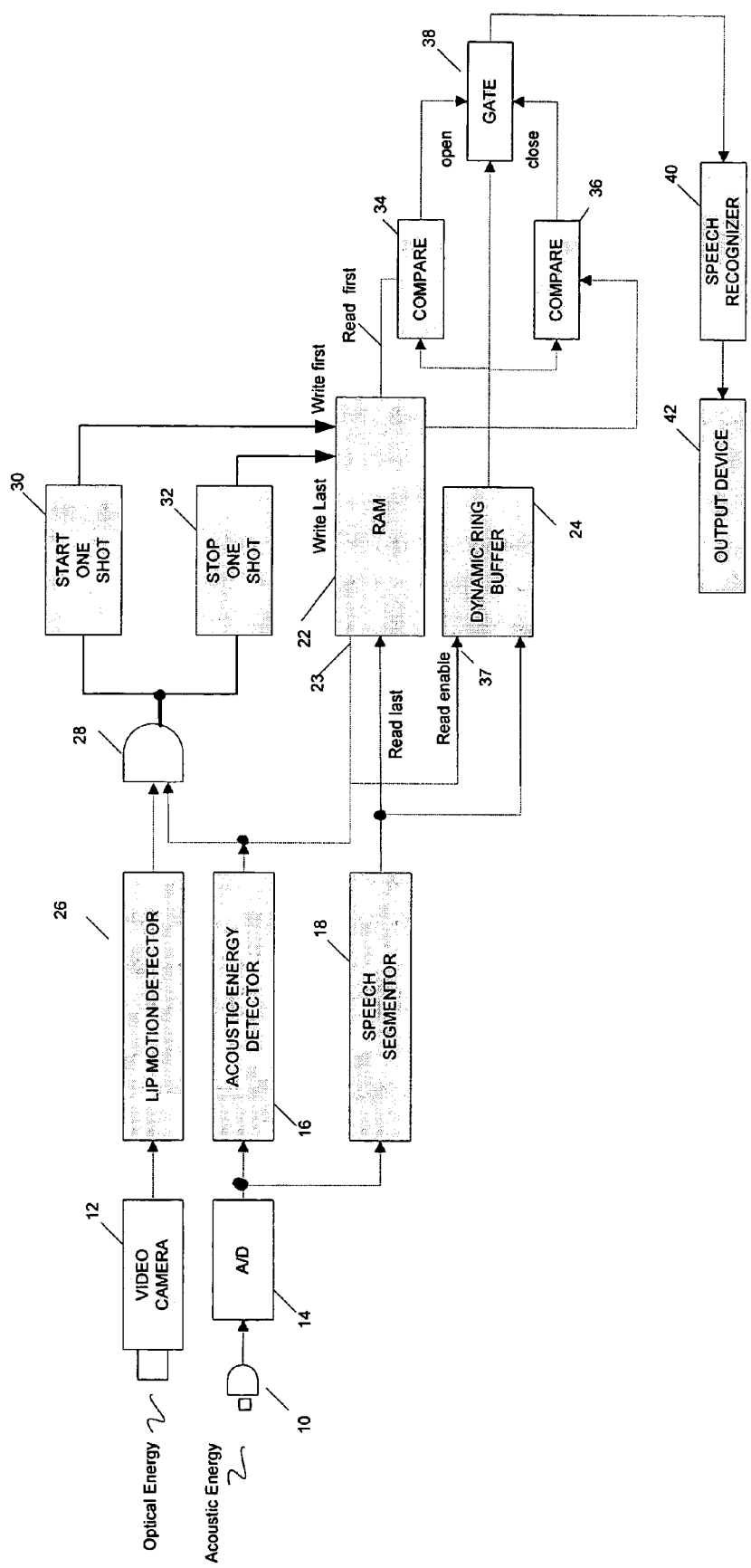
FIG. 1 is a block diagram of a preferred embodiment of the speech recognition system in accordance with one embodiment of the present invention.

Reference is now made to the FIG. 1 of the drawing wherein microphone 10 and video camera 12 are respectively responsive to acoustic energy in a spectrum including utterances of a speaker and optical energy associated with at least one facial characteristic, particularly lip motion, of utterances by the speaker. Microphone 10 and camera 12 respectively derive electrical signals that are replicas of the acoustic and optical energy incident on them in the spectra they are designed to handle.

The electrical output signal of microphone 10 drives analog to digital converter 14 which in turn drives acoustic energy detector circuit 16 and speech segmentor circuit 18 in parallel. Acoustic energy detector 16 derives a bi-level output signal having a true value in response to the digital output signal of converter 14 having a value indicating that acoustic energy above a predetermined threshold is incident on microphone 10. Speech segmentor 18 derives a digital signal that is divided into sequential speech segments, such as phonemes, for utterances of the speaker speaking into microphone 10.

Speech segmentor 18 supplies the sequential speech segments in parallel to random access memory (RAM) 22 and dynamic ring buffer 24. RAM 22 includes an enable input terminal 23 connected to be responsive to the bi-level output signal of acoustic energy detector 16. In response to energy detector 16 deriving a true value, as occurs when microphone 10 is responsive to a speaker making an utterance or ambient noise, RAM 22 is enabled to be responsive to the output of speech segmentor 18. When enabled, sequential memory locations, i.e., addresses, in RAM 22 are loaded with the sequential segments that segmentor 18 derives by virtue of a data input of the RAM being connected to the segmentor output. This is true regardless of whether the sequential segments are speech utterances or noise. RAM 22 has sufficient capacity to store the sequential speech segments of a typical utterance by the speaker as segmentor 18 is deriving the segments so that the first and last segments of a particular utterance, or noise, are stored at predetermined addresses in the RAM.

Dynamic ring buffer 24 includes a sufficiently large number of stages to store the sequential speech segments segmentor 18 derives for a typical utterance. Thus, buffer 24 effectively continuously records and maintains the last few seconds of acoustic energy supplied to microphone 10. RAM 22 and circuitry associated with it form a processing arrangement that effectively indexes dynamic ring buffer 24 to indicate when the first and last segments of utterances by the speaker who is talking into microphone 10 occur. If the acoustic energy incident on microphone 10 is not associated with an utterance, dynamic ring buffer 24 is not effectively indexed. Buffer 24 is part of a delay arrangement for assuring that (1) the beginning of each speech utterance is coupled to a speech recognizer and (2) upon completion of each utterance the speech recognizer is no longer responsive to a signal representing acoustical energy.

To perform indexing of buffer 24 only in response to utterances by the speaker who is talking into microphone 10, the system illustrated in FIG. 1 detects at least one facial characteristic associated with speech utterances of the speaker while acoustic energy is incident on microphone 10. The facial characteristic of the embodiment of FIG. 1 is detection of lip motion. To this end, video camera 12 derives a signal indicative of lip motion of the speaker speaking into microphone 10. The lip motion signal that camera 12 derives drives lip motion detector 26 which derives a bi-level signal having a true value while lip motion detector 26 senses that the lips of the speaker are moving and a zero value while lip motion detector 26 senses that the lips of the speaker are not moving.

The bi-level output signals of acoustic energy detector 16 and motion detector 26 drive AND gate 28 which derives a bi-level signal having a true value only while the bi-level output signals of detector 16 and 26 both have true values. Thus, AND gate 28 derives a true value only while microphone 10 and camera 12 are responsive to speech utterances by the speaker; at all other times, the output of AND gate 28 has a zero, i.e., not true, value.

The output signal of AND gate 28 drives one shot circuits 30 and 32 in parallel. One shot 30 derives a short duration pulse in response to the leading edge of the output signal of AND gate 28, i.e., in response to the output of the gate having a transition from the zero value to the true value. One shot 32 derives a short duration pulse in response to the trailing edge of the output signal of AND gate 28, i.e., in response to the output of the gate having a transition from the true value to the zero value. Hence, one shot circuits 30 and 32 respectively derive short duration pulses only at the beginning and end of a speech utterance. One shot circuits 30 and 32 do not derive any pulses if (1) acoustic energy detector 16 derives a true value while lip motion detector 26 derives a zero value, (2) lip motion detector 26 derives a true value while acoustic energy detector 16 derives a zero value, or (3) neither of detectors 16 nor 26 derives a true value.

The output pulses of one shot circuits 30 and 32 are supplied as write enable signals to first and second predetermined addresses of RAM 22. The first and second addresses are respectively for the first and last speech segments that segmentor 18 derives for a particular utterance. Hence, the first address stores the first speech segment that segmentor 18 derives for a particular utterance, while the second address stores the last speech segment that segmentor derives for that same utterance. RAM 22 is enabled to be responsive to the sequential segments that segmentor 18 derives and the output signals of one shot circuits 30 and 32 by virtue of acoustic energy detector 16 supplying the RAM enable input terminal 23 with a true value during the speech utterance. RAM 22 responds to a transition of the output of acoustic energy detector 16 from a true value to a zero value to read out the contents of the first and second addresses to input terminals of comparison circuits 34 and 36, respectively.

Comparison circuits 34 and 36 are respectively connected to be responsive to the contents of the speech segments stored in the first and second addresses of RAM 22 and the output of dynamic ring buffer 24 to detect the location in the ring buffer of the first and last speech segments of the particular utterance. In particular, upon the completion of a particular speech utterance, RAM 22 supplies (1) one input terminal of comparison circuit 34 with a signal indicative of the speech content of the first speech segment of that utterance and (2) one input terminal of comparison circuit 36 with a signal indicative of the speech content of the last speech segment of that utterance.

While RAM 22 is driving comparison circuits 34 and 36 with the signals indicative of the speech content of the first and last speech segments of the utterance, dynamic ring buffer 24 is enabled by the transition at the trailing edge of the bi-level output of acoustic energy detector 16 to sequentially derive, at a high frequency (i.e., a frequency considerably higher than the frequency at which the segments are transduced by microphone 10) the speech segments it stores. To this end, buffer 24 includes a read out enable input terminal 37 connected to be responsive to the trailing edge transition that detector 16 derives. While enabled for read out, dynamic ring buffer 24 supplies the sequential speech segments it derives in parallel to second input terminals of comparison circuits 34 and 36.

Comparison circuit 34 derives a pulse only in response to the speech segment that buffer 24 derives being the same as the first segment that RAM 22 supplies to comparison circuit 34. Comparison circuit 36 derives a pulse only in response to the speech segment that buffer 24 derives being the same as the last segment that RAM 22 supplies to comparison circuit 36. Gate 38 has first and second control input terminals respectively connected to be responsive to the output pulses of comparison circuits 34 and 36 and a data input terminal connected to be responsive to the sequential speech segments dynamic ring buffer 24 derives. Gate 38 is constructed so that in response to comparison circuit 34 supplying the first control input terminal of the gate with a pulse, the gate is opened and remains open until it is closed by comparison circuit 36 supplying the second control input terminal of the gate with a pulse.

While gate 38 is open, it passes to automatic speech recognizer 40 the first through the last speech segments dynamic ring buffer 24 supplies to its data input terminal. Automatic speech recognizer 40 can be of any known type that responds only to signals representing acoustic energy and produces an output signal indicative of the speech utterances of the speaker talking into microphone 10 while the speaker is being observed by video camera 12. The output signal of speech recognizer 40 drives output device 42. Examples of output device 42 are a computer character generator for driving a computer display with alphanumeric characters commensurate with the utterances or a machine for performing tasks commensurate with the utterances.

Figure 2:
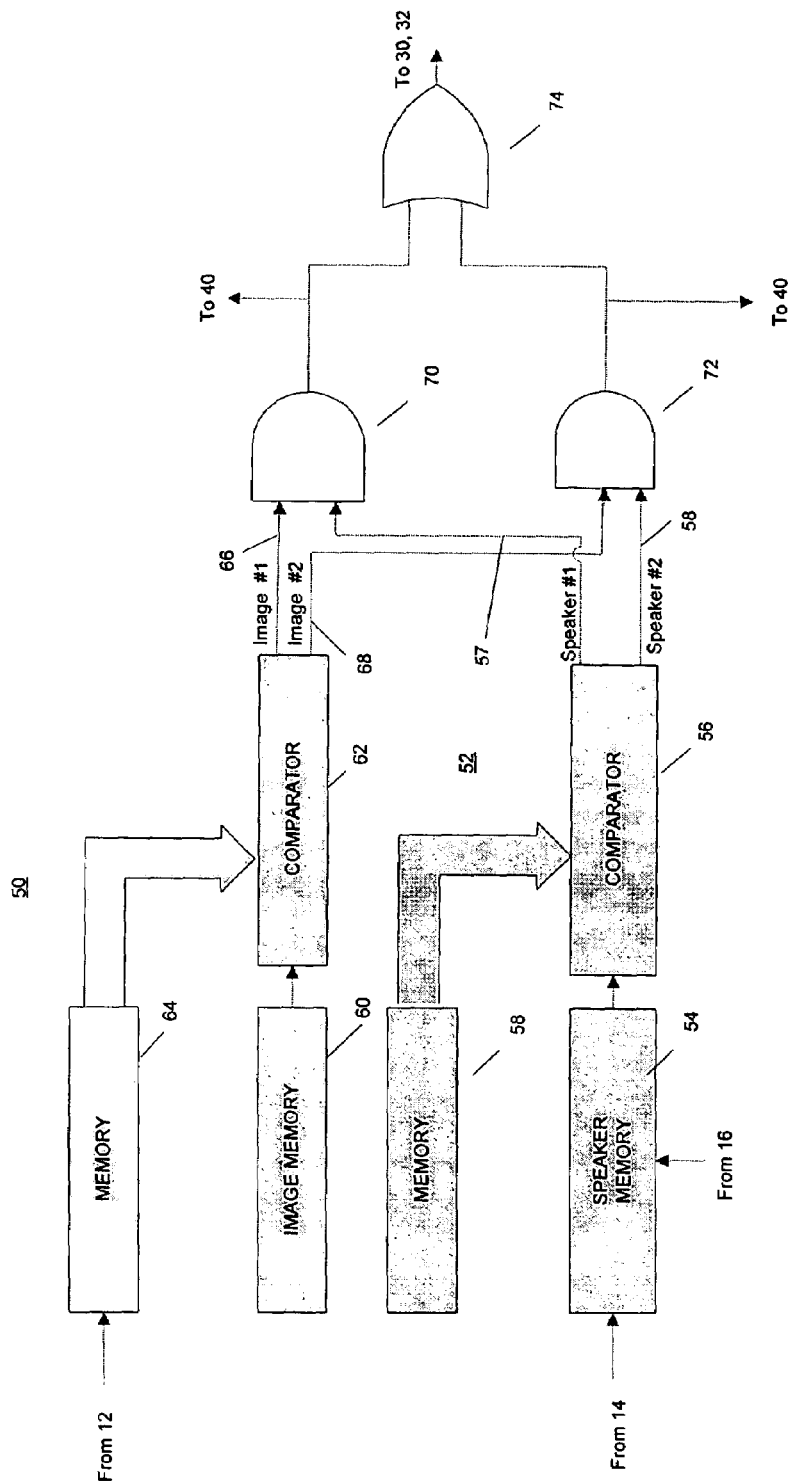
FIG. 2 is a block diagram of a modified portion of the speech recognition system of FIG. 1.

The speech recognition system of FIG. 1 can be modified by the arrangement illustrated in FIG. 2 so that the speech recognition system will not respond to speech utterances when the speaker is not looking at camera 12 and so that it can respond to speech utterances and the faces of a plurality of speakers. The apparatus illustrated in FIG. 2 is connected to respond to the output signal of acoustic energy detector 16, FIG. 1, and replaces lip motion detector 26 and AND gate 28.

The apparatus of FIG. 2 includes face recognizer 50, connected to be responsive to the output signal of video camera 12, and speaker identity recognizer 52, connected to be responsive to the output signal of acoustic energy detector 16. Face recognizer 50 and speech identity recognizer 52 are connected to other circuit elements and to speech recognizer 40 so that the speech recognizer is activated only when the speaker is facing video camera 12, that is, has a predetermined orientation relative to the video camera. Hence, if the speaker turns away from and is not looking directly into video camera 12 because the speaker is talking to someone and does not desire to have his/her voice recognized by recognizer 40, recognizer 40 is not activated. Speech recognizer 40 is only activated if the face recognizer 50 and speech recognizer 52 identify the same person. Face recognizer 50 and speech recognizer 52 are trained during at least one training period to recognize the face and speech of more than one person and speech recognizer 40 is activated only if the face and speech are recognized as being for the same person.

To these ends, speaker identity recognizer 52 includes memory 54 having one input connected to be responsive to the speech signal output of analog to digital converter 14 and a second input connected to be responsive to the output of acoustic energy detector 16 so that memory 54 stores short-term utterances of the speaker while detector 16 derives a true value. Upon the completion of the utterance, memory 54 supplies a digital signal indicative of the utterance to one input of comparator 56, having a second input responsive to memory 58 which stores digital signals indicative of the speech patterns of a plurality of speakers who have trained speech recognizer 40.

Comparator 56 derives a true output signal in response to the output signal of speaker memory 54 matching one of the speech patterns that memory 58 stores. Comparator 56 derives a separate true signal for each of the speakers having a speech pattern stored in memory 58. In FIG. 2, it is assumed that memory 58 stores speech patterns for first and second different speakers, whereby comparator 56 includes output leads 57 and 59, respectively provided for the first and second speakers. In response to comparator 56 recognizing the speaker as having speech characteristics the same as the speech pattern that memory 58 stores for the first and second speakers, comparator 57 respectively supplies true values to output leads 57 and 59.

Face recognizer 50 includes memory 60 having an input connected to be responsive to the output of video camera 12 so that memory 60 stores one frame of an image being viewed by video camera 12. Upon completion of the frame, memory 60 supplies a digital signal indicative of the frame contents to one input of comparator 62, having a second input responsive to memory 64 which stores digital signals indicative of the facial patterns of each of the plurality of speakers; the facial patterns memory 64 stores are derived while the speakers are looking directly into camera 12, that is, while the faces of the speakers have a predetermined orientation relative to the camera. Comparator 62 derives a true output signal in response to the output signal of memory 60 matching one of the facial patterns that memory 64 stores. Comparator 62 derives a separate true signal for each of the speakers with facial images stored in memory 64. In the example of FIG. 2, memory 64 stores facial images for the first and second speakers, whereby comparator 64 includes output leads 66 and 68, respectively provided for the first and second speakers. In response to comparator 64 recognizing the speaker as having a facial image the same as one of the facial images that memory 60 stores for the first and second speakers, comparator 62 respectively supplies true values to output leads 66 and 68.

During a training period for each of the speakers, each of the speakers recites a predetermined sequence of words, and the speaker is looking directly into video camera 12. At this time, speaker memory 54 is connected to an input of memory 58 to cause the memory 58 to store speech patterns for each of the plurality of speakers who train speech recognizer 40. At the same time, image memory 60 is connected to an input of memory 64, to cause memory 64 to store a facial image for each of the plurality of speakers who train speech recognizer 40. During the training period for each of the speakers, the output of speech segmentor 16 is supplied to the input of speech recognizer 40 to enable the speech recognizer to learn the speech patterns of each of the speakers, in a manner known to those skilled in the art.

The output signals of comparators 56 and 62 on leads 57 and 66 are supplied to inputs of AND gate 70, while the output signals of the comparators on leads 59 and 68 are supplied to inputs of AND gate 72. Hence, AND gate 70 derives a true value only in response to face recognizer 50 and speech identity recognizer 52 both recognizing that a speaker is the first speaker who is looking directly into camera 12. Similarly, AND gate 72 derives a true value only in response to face recognizer 50 and speech identity recognizer 52 both recognizing that a speaker is the second speaker who is looking directly into camera 12. AND gates 70 and 72 derive bi-level signals that are supplied to OR gate 74 which derives a true value in response to either the first or second speakers being identified from the voice and facial characteristics thereof.

The output signal of OR gate 74 drives one shots in the same manner that the output of AND gate 28 drives the one shots. Consequently, the speech signal of the first or second speaker is supplied to speech recognizer 40 in the same manner that the speech signal is supplied to speech recognizer 40 in the embodiment of FIG. 1.

To enable speech recognizer 40 of FIG. 2 to recognize both speakers, the outputs of AND gates 70 and 72 are supplied to speech recognizer 40. Speech recognizer 40 responds to the outputs of AND gates 70 and 72 to analyze the speech of the correct speaker, in a manner known to those skilled in the art.

While there has been described and illustrated a specific embodiment of the invention, it will be clear that variations in the details of the embodiment specifically illustrated and described may be made without departing from the true spirit and scope of the invention as defined in the appended claims. For example, the discrete circuit elements can be replaced by a programmed computer.

We claim:

1. A speech recognition system comprising:
   an acoustic detector for detecting speech utterances of a speaker using an audio input device;
   a visual detector for detecting at least one facial characteristic associated with speech utterances of the speaker;
   a processing arrangement connected to be responsive to the acoustic and visual detectors for deriving a signal having first and second values respectively indicative of the speaker making and not making speech utterances such that the first value is derived in response to the acoustic detector detecting a finite, nonzero acoustic response while the visual detector detects at least one facial characteristic associated with speech utterance of the speaker, said processing arrangement comprising a circular buffer for continuously receiving and maintaining a most recent time period of the acoustic response supplied to said audio input device, said time period having a duration corresponding to that predefined for a typical speech utterance; and
   a speech recognizer for deriving an output indicative of the speech utterances as detected only by the acoustic detector, the speech recognizer being connected to be responsive to the acoustic detector in response to the signal having the first value.

2. The speech recognition system of claim 1 wherein the processing arrangement causes the signal to have the second value in response to any of:
   (a) the acoustic detector not detecting a finite, nonzero acoustic response while the visual detector does not detect speech utterances of the speaker,
   (b) the acoustic detector detecting a finite, nonzero acoustic response while the visual detector does not detect speech utterances of the speaker, and
   (c) the acoustic detector not detecting a finite, nonzero acoustic response while the visual detector detects speech utterances of the speaker.

3. The speech recognition system of claim 1 wherein the circular buffer assures that the beginning of each speech utterance is coupled to the speech recognizer.

4. The speech recognition system of claim 3 wherein the circular buffer is connected to be responsive to the acoustic detector, the circular buffer including a plurality of stages for storing sequential segments of the output of the acoustic detector, the delay arrangement being such that the contents of the memory element stage storing the beginning of a speech utterance are initially coupled to the speech recognizer.

5. The speech recognition system of claim 1 wherein the processing arrangement includes a delay arrangement for assuring that in response to completion of each speech utterance the acoustic detector is decoupled from the speech recognizer.

6. The speech recognition system of claim 1 wherein the processing arrangement includes a face recognizer connected to be responsive to the visual detector.

7. The speech recognition system of claim 6 wherein the face recognizer is arranged for enabling the signal to have the first value in response to the face of the speaker being at a predetermined orientation relative to the visual detector.

8. The speech recognition system of claim 7 wherein the face recognizer is arranged for:
   (1) detecting and distinguishing the faces of a plurality of speakers, and
   (2) enabling the signal to have the first value in response to the speaker having a recognized face.

9. The speech recognition system of claim 8 wherein the processing arrangement includes a speaker identity recognizer connected to be responsive to the acoustic detector, the speaker identity recognizer being arranged for:

(1) detecting and distinguishing speech patterns of a plurality of speakers, and
(2) enabling the signal to have the first value in response to the speaker having a recognized speech pattern.

10. The speech recognition system of claim 9 wherein the processing arrangement is arranged for causing the signal to have the first value in response to the speaker having a recognized face matched with a recognized speech pattern of the same speaker.

11. The speech recognition system of claim 1 wherein the processing arrangement includes a face recognizer connected to be responsive to the visual detector and a speaker identity recognizer connected to be responsive to the acoustic detector, the face recognizer being arranged for detecting and distinguishing the faces of a plurality of speakers, the speaker identity recognizer being arranged for detecting and distinguishing speech patterns of a plurality of speakers, the processing arrangement being arranged for enabling the signal to have the first value only in response to the speaker having a recognized face matched with a recognized speech pattern of the same speaker.

12. The system of claim 1, further comprising a segmentor, and, for the continuous maintaining, a circular buffer having a number of stages sufficiently large to store sequential speech segments said segmentor would derive from said typical speech utterance.

13. A method of recognizing speech utterances of a speaker with an automatic speech recognizer only responsive to acoustic speech utterances of the speaker comprising:
predefining a time duration corresponding to a typical speech utterance;
detecting acoustic energy having a spectrum associated with speech utterances,
continuously receiving and maintaining a most recent time period of the acoustic energy, said period having said duration,
detecting at least one facial characteristic associated with speech utterances of the speaker, and
activating the automatic speech recognizer in response to the detected acoustic energy having a spectrum associated with speech utterances while the at least one facial characteristic associated with the speech utterances of the speaker is occurring.

14. The method of claim 13 further comprising preventing activation of the automatic speech recognizer in response to any of:
(a) no acoustic energy having a spectrum associated with speech utterances being detected while no facial characteristic associated with speech utterances of the speaker is detected,
(b) acoustic energy having a spectrum associated with speech utterances being detected while no facial characteristic associated with speech utterances of the speaker is detected, and
(c) no acoustic energy having a spectrum associated with speech utterances being detected while at least one facial characteristic associated with speech utterances of the speaker is detected.

15. The method of claim 13 further comprising assuring that the beginning of each speech utterance is coupled to the speech recognizer.

16. The method of claim 15 wherein the beginning of each speech utterance is assuredly coupled to the speech recognizer by:
(a) delaying the speech utterance,
(b) recognizing the beginning of each speech utterance, and
(c) responding to the recognized beginning of each speech utterance to couple the delayed speech utterance associated with the beginning of each speech utterance to the speech recognizer and thereafter sequentially coupling the remaining delayed speech utterances to the speech recognizer.

17. The method of claim 13 further comprising assuring that no detected acoustic energy is coupled to the speech recognizer upon the completion of a speech utterance.

18. The method of claim 17 wherein assurance that no detected acoustic energy is coupled to the speech recognizer upon the completion of a speech utterance is provided by: (a) delaying the acoustic energy associated with the speech utterance, (b) recognizing the completion of each speech utterance, and (c) responding to the recognized completion of each speech utterance to decouple delayed acoustic energy occurring after the completion of each speech utterance from the speech recognizer.

19. The method of claim 13 wherein the at least one facial characteristic indicates the face of the speaker has a predetermined orientation relative to a detector involved in the step of detecting the at least one facial characteristic.

20. The method of claim 19 further comprising distinguishing the face of the speaker from a plurality of speakers, distinguishing the speech pattern of the speaker from a plurality of speakers, and activating the automatic speech recognizer in response to the speaker having a recognized face matched with a recognized speech pattern of the same speaker.

21. The method of claim 13 further comprising distinguishing the face of the speaker from a plurality of speakers, distinguishing the speech pattern of the speaker from a plurality of speakers, and activating the automatic speech recognizer in response to the speaker having a recognized face matched with a recognized speech pattern of the same speaker.

22. The method of claim 21 further including storing:
(1) images of the faces of a plurality of speakers, and
(2) the speech patterns of the same plurality of speakers during at least one training period; and performing the distinguishing steps by comparing the stored images and speech patterns with images of the face of the speaker and the speech pattern of the speaker.

23. The method of claim 13, further comprising providing a segmentor, and, for the continuous maintaining, a circular buffer having a number of stages sufficiently large to store sequential speech segments said segmentor would derive from said typical speech utterance.

24. The method of claim 13, wherein said detecting of current occurrence of at least one facial characteristic associated with speech utterances pertains to speech utterances of the speaker, said activating occurs in response to said detecting that acoustic energy currently has a spectrum associated with speech utterances being concurrent with said detecting of current occurrence of said detecting at least one facial characteristic associated with speech utterances of the speaker.

25. A speech recognition system comprising:
an acoustic detector for detecting speech utterances of a speaker using an audio input device;
a visual detector for detecting at least one facial characteristic associated with speech utterances of the speaker;
a processing arrangement comprising a circular buffer and connected to be responsive to the acoustic and visual detectors for deriving a signal having first and second values respectively indicative of the speaker making and not making speech utterances such that the first value is derived in response to the acoustic detector detecting, while the visual detector detects at least one facial characteristic associated with speech utterance of the speaker, that an acoustic response supplied to said audio input device and currently stored in said circular buffer is finite and nonzero, said circular buffer being configured for continuously receiving and maintaining a most recent time period of said acoustic response to be subject to said detecting by the acoustic detector, said time period having a duration corresponding to that predefined for a typical speech utterance; and a speech recognizer for deriving an output indicative of the speech utterances as detected only by the acoustic detector, the speech recognizer being connected to be responsive to the acoustic detector in response to the signal having the first value.

* * * * *